(12) United States Patent
Griffin et al.

(10) Patent No.: US 8,783,949 B2
(45) Date of Patent: Jul. 22, 2014

(54) SELF-CALIBRATING, WIDE-RANGE TEMPERATURE SENSOR

(75) Inventors: Jed Griffin, Peyton, CO (US); Daniel J. Russell, Monument, CO (US)

(73) Assignee: Atmel Corporation, San Jose, CA (US)

( * ) Notice: Subject to any disclaimer, the term of this patent is extended or adjusted under 35 U.S.C. 154(b) by 490 days.

(21) Appl. No.: 12/620,392

(22) Filed: Nov. 17, 2009

(65) Prior Publication Data

US 2011/0116527 A1 May 19, 2011

(51) Int. Cl.
*G01K 7/01* (2006.01)
*G01K 15/00* (2006.01)

(52) U.S. Cl.
USPC ............ 374/178; 374/1; 702/99; 702/130; 702/183; 327/513

(58) Field of Classification Search
USPC ......... 374/170, 178, 183, 185, 163, 141, 100, 374/1; 327/512–513; 702/99, 130–136
See application file for complete search history.

(56) References Cited

U.S. PATENT DOCUMENTS

| | | | | |
|---|---|---|---|---|
| 5,546,041 A * | 8/1996 | Szajda | ........................... | 327/512 |
| 5,873,053 A * | 2/1999 | Pricer et al. | .................... | 702/130 |
| 5,900,773 A * | 5/1999 | Susak | ........................... | 327/539 |
| 6,008,685 A * | 12/1999 | Kunst | ........................... | 327/512 |
| 6,181,171 B1 * | 1/2001 | Graf et al. | ..................... | 327/110 |
| 6,215,353 B1 * | 4/2001 | Lewyn | ........................... | 327/538 |
| 6,255,891 B1 * | 7/2001 | Matsuno et al. | .............. | 327/512 |
| 6,554,469 B1 * | 4/2003 | Thomson et al. | ............. | 374/178 |
| 6,567,763 B1 * | 5/2003 | Javanifard et al. | ............ | 702/130 |
| 6,799,889 B2 * | 10/2004 | Pennock | ........................ | 374/178 |
| 7,118,274 B2 * | 10/2006 | Van Phan et al. | ............. | 374/178 |
| 7,197,421 B2 * | 3/2007 | Pan | ................................. | 702/133 |
| 7,394,308 B1 * | 7/2008 | Stiff et al. | ...................... | 327/543 |
| 7,579,860 B2 * | 8/2009 | Deken | ....................... | 324/760.01 |
| 8,093,880 B2 * | 1/2012 | Boas et al. | .................... | 323/312 |
| 8,405,451 B2 * | 3/2013 | Fukami | ......................... | 327/543 |
| 2002/0093375 A1 * | 7/2002 | Grossnickle et al. | ......... | 327/543 |
| 2004/0062292 A1 * | 4/2004 | Pennock | ........................ | 374/170 |
| 2005/0259718 A1 * | 11/2005 | Phan et al. | ..................... | 374/178 |
| 2006/0153277 A1 * | 7/2006 | Yoshida | ......................... | 374/178 |
| 2006/0203883 A1 * | 9/2006 | Griffin | .......................... | 374/178 |
| 2008/0036524 A1 * | 2/2008 | Oberhuber | ..................... | 327/512 |
| 2008/0061863 A1 * | 3/2008 | De Barros Soldera et al. | ............................. | 327/512 |
| 2008/0285624 A1 * | 11/2008 | Igarashi | ........................ | 374/178 |
| 2009/0059997 A1 * | 3/2009 | Sudo | ............................... | 374/173 |
| 2009/0146725 A1 * | 6/2009 | Kimura | ......................... | 327/512 |
| 2010/0073071 A1 * | 3/2010 | Chien et al. | .................... | 327/513 |
| 2010/0123510 A1 * | 5/2010 | Yoshikawa | .................... | 327/512 |
| 2010/0127687 A1 * | 5/2010 | Boas et al. | .................... | 323/311 |
| 2012/0327972 A1 * | 12/2012 | Seon | ............................. | 374/178 |
| 2013/0083825 A1 * | 4/2013 | Zhang et al. | .................. | 374/178 |

* cited by examiner

*Primary Examiner* — Gail Verbitsky
(74) *Attorney, Agent, or Firm* — Fish & Richardson P.C.

(57) ABSTRACT

A self-calibrating, wide-range temperature sensor includes a current reference, impervious to process and voltage, with the current reference mirrored into two oppositely-sized bipolar transistors or diodes. Duplicate current sources are used with a ratio of geometries between them, such that the larger current biases the smaller bipolar transistor (less cross-sectional area) and the smaller current source biases the larger bipolar transistor (higher cross-sectional area). The current source in conjunction with the differential temperature sensing provides inherent calibration without drift while the differential sensing, from the ratio of geometries in the current paths also increases sensitivity.

6 Claims, 4 Drawing Sheets

SELF-CALIBRATING, WIDE-RANGE TEMPERATURE SENSOR

TECHNICAL FIELD

This subject matter is generally related to electronics, and more particularly to self-calibrating temperature sensors.

BACKGROUND

The explicit calibration of temperature sensors is implemented in integrated circuits and is common practice. These die-to-die adjustment calibrations, however, are time consuming and costly. Self-calibrating temperature sensors have been developed to eliminate die-to-die adjustment calibrations. These sensors, however, are inadequate as they can produce large inaccuracies over a small temperature sensing range. Even if the accuracies are acceptable, the narrow temperature sensing range severely limits the utility of these self-calibrating temperature sensors for many applications.

SUMMARY

A self-calibrating, wide-range temperature sensor includes a current reference (e.g., a current that is impervious to process and voltage variations) mirrored into two oppositely-sized bipolar transistors or diodes. Duplicate current sources with a ratio of geometries between them are used as current references, where the larger current source biases the smaller bipolar transistor (less cross-sectional area) and the smaller current source biases the larger bipolar transistor (higher cross-sectional area). The current source in conjunction with differential temperature sensing provides inherent calibration without drift while differential sensing from the ratio of geometries in the current paths also increases sensitivity.

A advantage of the disclosed self-calibrating temperature sensor over previously known solutions is that the sensor can accurately sense temperatures over wide temperature ranges while eliminating die-to-die adjustment calibrations.

DETAILED DESCRIPTION

Figure 1:
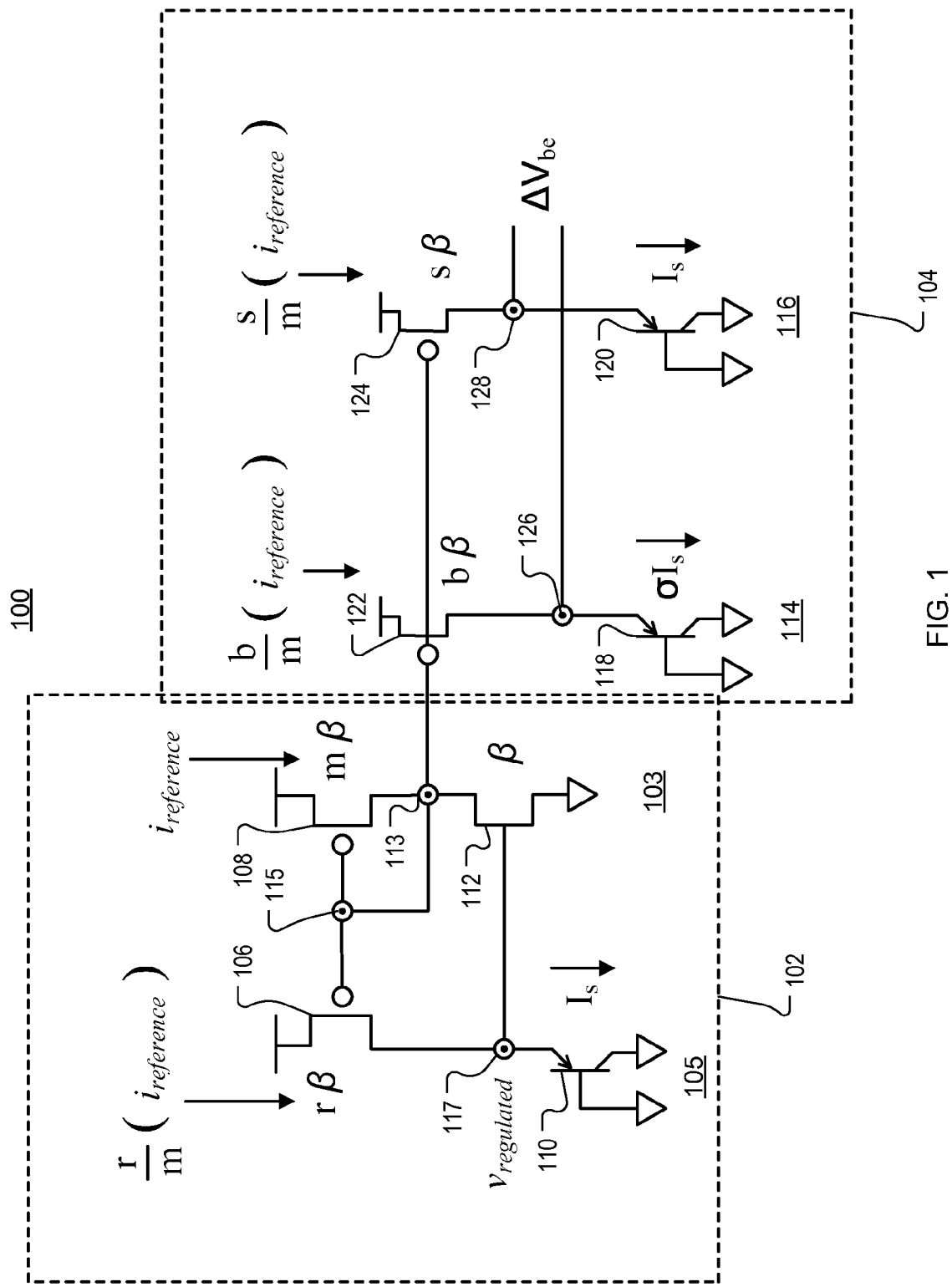
FIG. 1 is a schematic diagram of an example self-calibrated, wide-range, temperature sensor.

FIG. 1 is a schematic diagram of an example self-calibrated, wide-range, temperature sensor. In some implementations, a self-calibrated, wide-range, temperature sensor 100 can include a current reference 102 coupled to differential sensing paths 104. The current reference 102 can include transistors 106, 108, 110 and 112. The transistors 106, 108 and 112 can be Complementary metal-oxide-semiconductor (CMOS), n-channel transistors. The transistor 110 can be a bipolar transistor (e.g., PNP or NPN type transistors) or diode. In the sensor 100, transistors 106, 108 are p-channel CMOS transistors and 112 are n-channel, CMOS transistors, and transistor 110 is a bipolar transistor.

Referring now to the current reference 102, a path 105 includes a transistor 106 and a transistor 110 (or a diode), and a path 103 includes a transistor 108 and a transistor 112. The gate terminal of the transistor 106 is coupled to the gate terminal and drain terminal of the transistor 108 at node 115. The drain terminal of the transistor 108 is also coupled to the drain terminal of the transistor 112 at node 113. The drain terminal of the transistor 106 is coupled to the emitter terminal of the transistor 110. A regulated voltage, $V_{regulated}$, is applied at node 117 which couples together the drain terminal of transistor 106 and the emitter terminal of the transistor 110. The base terminal and collector terminal of the transistor 110 are coupled to a reference voltage (e.g., ground). The emitter terminal of the transistor 110 is coupled to the gate terminal of the transistor 112. The source terminal of the transistor 112 is coupled to a reference voltage (e.g., ground).

The configuration of the current reference 102 described above is impervious to voltage and process variations. The operation of the current reference 102 can be observed intuitively as reducing error through feedback attenuation as described in reference to FIG. 2. The reference current is set by the n-channel, CMOS transistor 112 which can be either a high-threshold (thick-gate) device, in weak inversion or biased in the subthreshold region, or it can be a low-threshold (thin-gate) device, in strong inversion or biased in the saturation region. In this configuration, $i_{reference}$ in path 103 is mirrored into paths 105, 114 and 116.

Referring to the differential sensing paths 104, a first sensing path 114 can include a transistor 122 (e.g., p-channel, CMOS transistor) having a drain terminal connected to the emitter terminal of a transistor 118 (e.g., PNP type bipolar transistor or diode) at node 126. The gate terminal of the transistor 122 is coupled to the current reference 102 at node 113. The base terminal and collector terminal of the transistor 118 is coupled to a reference voltage (e.g., ground).

A second sensing path 116 can include a transistor 124 (e.g., p-channel, CMOS transistor) having a drain terminal connected to the emitter terminal of bipolar transistor 120 (e.g., PNP type bipolar transistor or diode) at node 128. The gate terminals of transistors 122, 124 are coupled together. The base terminal and collector terminal of transistor 120 are coupled to a reference voltage (e.g., ground). A change of emitter-based voltage, $\Delta V_{be}$, which varies in proportion to temperature can be taken from nodes 126 and 128.

The duplicate current sources in paths 114, 116 have a ratio of geometries between them that are used as current references, where the smaller current source b/m ($i_{reference}$) biases the larger transistor 118 (more cross-sectional area) and the larger current source s/m ($i_{reference}$) biases the smaller transistor 120 (lesser cross-sectional area). The differential sensing paths 104, in conjunction with canceling voltage and process effects, maximize sensitivity through optimal headroom and setting extreme ratios between geometries in the differential sensing paths 104. The subsequent calculations correspond to the high-threshold, n-channel CMOS transistor 112 shown in FIG. 1 and the results shown in FIG. 3. The calculations for the low-threshold case would be similar.

Referring to the sensor 100, the current source 102 provides a reference that is immune to process and voltage variations in equations [1] to [3]. In the case of a thick-gate (high-threshold), CMOS, n-channel transistor 112 operating in the subthreshold region, the drain current is given by $$i_D = \frac{\beta}{K'} I_{D_o} e^{\frac{V_{GS}}{nCMOS V_T}}, \qquad [1]$$

where $\beta = \frac{W}{L} K'$, $K' = \mu_{ox} C_{ox}$,

W and L are the gate width and gate length, respectively, $\mu_{ox}$ is the charge carrier effective mobility, $C_{ox}$ is the gate oxide capacitance per unit area, $V_{GS}$ is the gate-to-source voltage, $n_{CMOS}$ is a non-ideality factor for the device, $V_T$ is the threshold voltage of the device and $I_{D_o}$ is the current at $V_{GS}=V_T$.

The regulated voltage across the bipolar transistor 110 (e.g., voltage at node 117 in FIG. 1) is given by $$v_{regulated} = \frac{n}{1 - \frac{n}{n_{CMOS}}} V_T \ln\left(\frac{r\beta I_{D_o}}{mK'I_S}\right), \quad [2]$$

and the reference current, $i_{reference}$, 103 is given by $$i_{reference} = \frac{\beta}{K'} I_{D_o} \left(\frac{r\beta I_{D_o}}{mK'I_S}\right)^{\frac{1}{1 - \frac{n}{n_{CMOS}}}}, \quad [3]$$

where m and r are controlled geometry parameters, n is a non-ideality factor for the bipolar transistor 110 (which behaves like a diode) and $I_s$ is the saturation current. The non-ideality factor is a parameter of a diode or bipolar transistor that measures the deviation of the diode from its ideal behavior. An example range for the non-ideality factor can be 0.95 to 2.

The differential temperature sensing can be derived from the differential sensing paths 104 of the sensor 100 in FIG. 1. Given that there is no Early Voltage in this configuration, the change of the emitter-based voltage $\Delta V_{be}$ (which is proportional to temperature) is given by $$\frac{V_{be_h}}{n_h} - \frac{V_{be_l}}{n_l} = \frac{k\ln\left(\frac{s}{b}\sigma\right)}{q} T, \quad [4]$$

which can be simplified to equation [5] when the non-ideality factors $n_h$ and $n_l$ for the transistors 118, 120 (which behave as diodes) in sense paths 114, 116 can be kept nearly equal ($n_h=n_l=n$)

$$\Delta V_{be} \approx \frac{nk\ln\left(\frac{s}{b}\sigma\right)}{q} T, \quad [5]$$

where s and b are controllable geometry parameters, $\sigma$ is the ratio of cross-sectional areas in the transistors 118, 120, k is Boltzman's constant ($1.38\times10^{-23}$ J/° K), q is the electronic charge ($1.69\times10^{-19}$ Coulomb) and T is temperature in Kelvin. From equation [5], to have a high sensitivity the factor $$\left(\frac{s}{b}\sigma\right)$$

should be large. The current ratio parameters, b and s, can be set for a sensitivity that is well above device noise, and optimally high, or something on the order of 1 mV/C. The reference current parameters, m and r, can be set to minimize variation in the reference current.

Figure 3A:
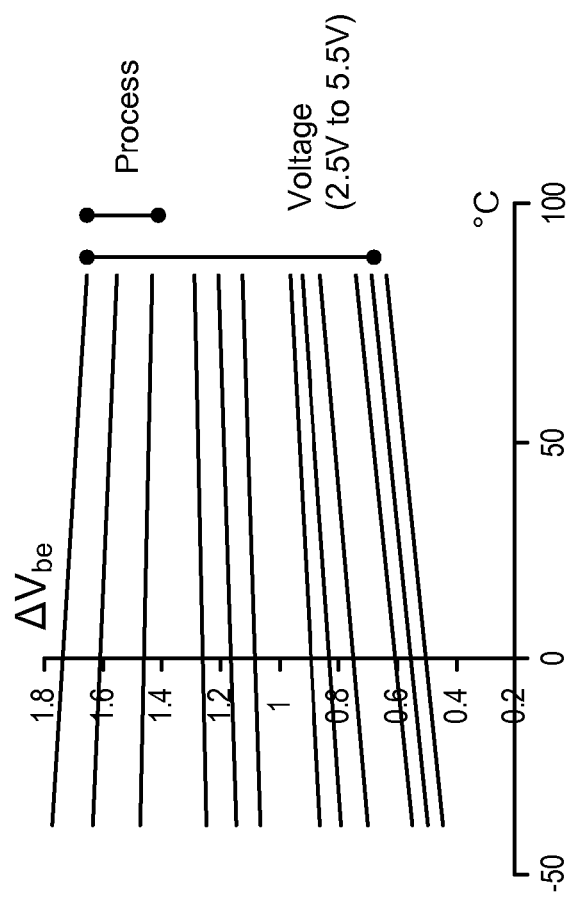
FIGS. 3A and 3B are plots comparing the performance of a self-calibrating and an un-calibrated temperature sensor.
Figure 3B:
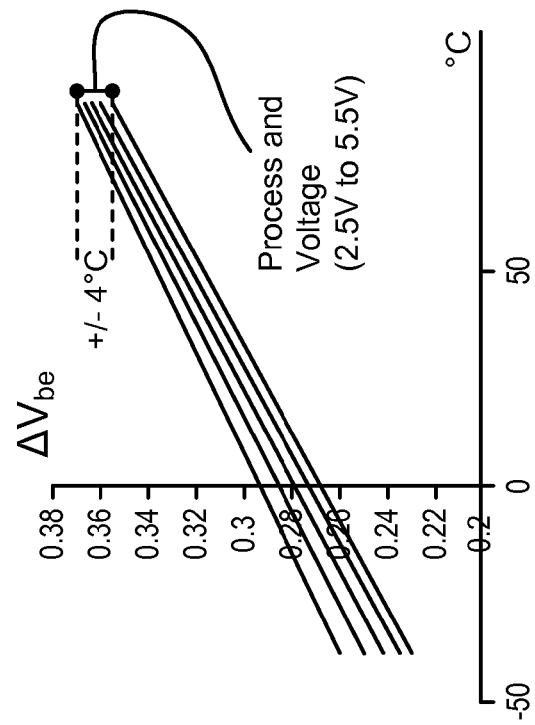

As can be observed from equation [5], the sensitivity can be directly controlled by geometries, and is specifically proportional to the natural log of the s to b ratio times the ratio of cross-sectional areas in the bipolar transistors, $\sigma$. In practice, a limit can be placed on the ratios, and hence the sensitivity, by the constraint of keeping the non-ideality factors nearly equal, as higher current densities in the transistors 118, 120 can move the non-ideality factors closer to 2. The behavior that is not shown in equations [4] and [5] is the contact potential and the ohmic losses, both of which depend on the bias currents. Hence the need for the constant current reference 102 relative to process and voltage which is represented by FIGS. 3A and 3B. The contact potential and ohmic losses result in large offsets and slope variations of voltage-current (V-C) curves if differential sensing is not tightly controlled by a constant current reference.

Figure 2:
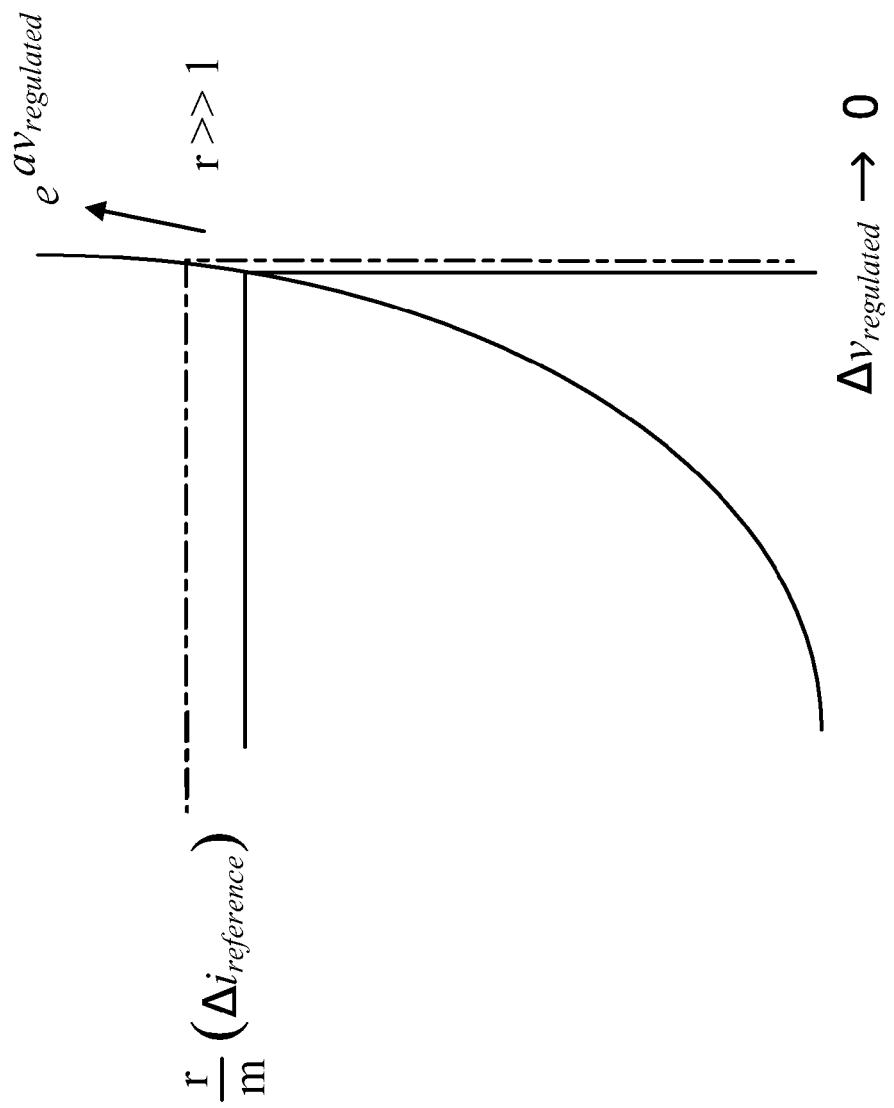
FIG. 2 is a plot illustrating the feedback attenuation of error to lock in a current reference.

FIG. 2 illustrates feedback attenuation of error to lock in the current reference. More particularly, the figure illustrates how deviations in reference current can be attenuated by setting r<<m and attenuating deviations further by exponential compression of the bipolar transistor or diode. Performance is a function of area. Some example values that yield adequate performance are r=10 and m=40. Though the larger r and m are the more 106 margin in the saturation region (the more constant the current mirroring into 106) and the larger the transistor lengths on all the CMOS transistors the less the channel length modulation (the more precise the current mirroring).

FIGS. 3A and 3B are plots showing the performance of a self-calibrating, wide-range temperature sensor and a conventional un-calibrated temperature sensor, respectively. The results shown were observed under more extreme voltages than typical, 2.5V to 5.5V, and 3 sigma variation on process for the self-calibrated, wide-range temperature sensor and the conventional un-calibrated temperature sensor. Sensitivity is shown around 1 mV/° C. Each curve is measured temperatures from −40° C. to 85° C. at a specific voltage and process skew, sweeping both voltage and process skew simultaneously to generate all curves. The self calibrating can be seen as much tighter, much more aligned, curves in FIG. 3A versus the much more divergent curves in FIG. 3B.

Figure 4:
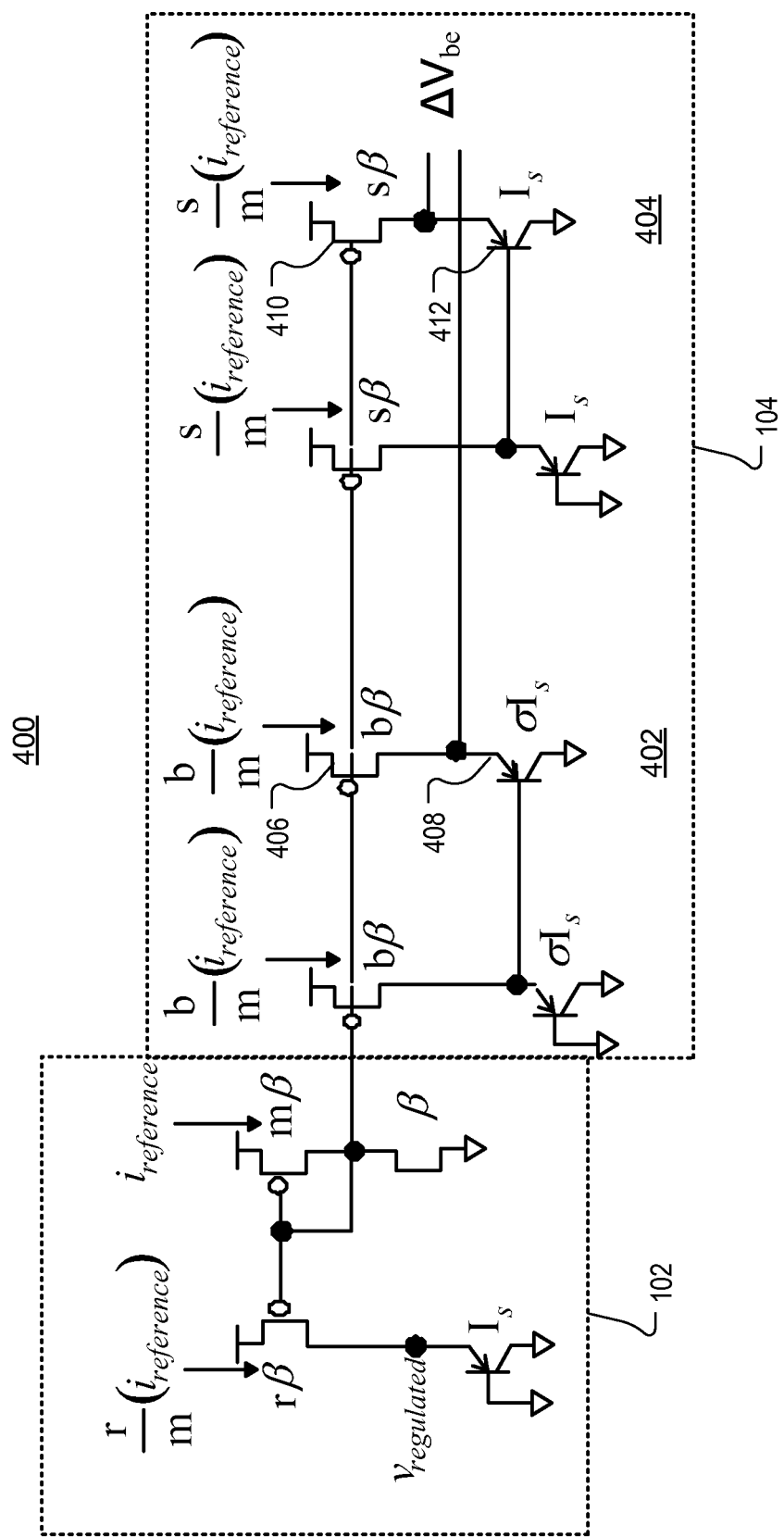
FIG. 4 is a schematic diagram of an example self-calibrated, wide-range, temperature sensor with double sensitivity per geometry.

FIG. 4 is a schematic diagram of an example self-calibrated, wide-range, temperature sensor 400 with double sensitivity per geometry. Neglecting base currents and Early Voltage (which will also have some cancellation due to the differential configuration), two additional transistors (e.g., PNP type transistors) can be added to the sensor 100 of FIG. 1. In particular, additional sensing paths 402, 404 can be included in the sensor 400. A CMOS transistor 406 and a bipolar transistor 408 (or diode) can be added to sensing path 402, and a CMOS transistor 410 and a bipolar transistor 412 can be added to sensing path 404, as shown in FIG. 4. In this configuration, the sensitivity doubles as can be observed in equation [6] for the output voltage variation $$\Delta V_{be} \approx N \frac{nk\ln\left(\frac{s}{b}\sigma\right)}{q} T, \quad [6]$$

where N=2. Generally, N an integer having a value that is based at least in part on the number of additional sensing paths added to sensor 400.

This enhanced sensitivity can be doubled per fixed geometries (ratios between devices). The geometries can be halved for a fixed sensitivity, thus relaxing by half the ratio on currents in the sensing paths. This latter advantage can help keep the sensitivity and current densities high (e.g., above device noise), also reducing the difference in non-ideality factors between the differential sensing paths (hence eliminating sensing error per fixed sensitivity). Thus, by extending the differential sensing paths 104 with additional sensing paths with transistors having fixed geometries the sensitivity of sensor 400 can be increased.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A temperature sensor circuit, comprising:
   a current reference circuit coupled to a pair of current sources having a ratio of geometries between them, the current reference circuit configured to provide a first reference current and a second reference current, where the first reference current is larger than the second reference current by an amount determined by the ratio of geometries, wherein the current reference circuit comprises:
      a first transistor having a source terminal and a drain terminal, where the source terminal of the first transistor is coupled to a first current source of the pair of current sources;
      a second transistor having a source terminal coupled to a second current source of the pair of current sources, where respective gates of the first and second transistors are coupled together and to a drain terminal of the second transistor;
      a third transistor having a source terminal coupled to the drain terminal of the second transistor; and
      a third bipolar transistor having base and collector terminals coupled to a reference voltage and an emitter terminal coupled to the drain terminal of the first transistor; and
   a differential sensing path circuit coupled to the current reference circuit, the differential sensing path circuit including at least one pair of oppositely-sized bipolar transistors or diodes, the differential sensing path circuit configured to bias a first bipolar transistor or diode with the first reference current and to bias a second bipolar transistor or diode with the second reference current, where the first bipolar transistor or diode has a smaller cross-sectional area than a cross-sectional area of the second bipolar transistor or diode.

2. The circuit of claim 1, where a regulated voltage is applied to a node coupled to a drain terminal of the first transistor and the emitter terminal of the third bipolar transistor.

3. The circuit of claim 1, where the first transistor is an n-channel, complementary metal-oxide-semiconductor (CMOS) transistor with a high-threshold voltage and is biased in a subthreshold region.

4. The circuit of claim 1, where the first transistor is an n-channel, complementary metal-oxide-semiconductor (CMOS) transistor with a low-threshold voltage and is biased in a saturation region.

5. A temperature sensor circuit, comprising:
   a current reference circuit coupled to a pair of current sources having a ratio of geometries between them, the current reference circuit configured to provide a first reference current and a second reference current, where the first reference current is larger than the second reference current by an amount determined by the ratio of geometries; and
   a differential sensing path circuit coupled to the current reference circuit, the differential sensing path circuit including at least one pair of oppositely-sized bipolar transistors, the differential sensing path circuit configured to bias a first bipolar transistor with the first reference current and to bias a second bipolar transistor with the second reference current, where the first bipolar transistor has a smaller cross-sectional area than a cross-sectional area of the second bipolar transistor, where the differential sensing path circuit further comprises a number of differential sensing paths, a first sensing path including the first bipolar transistor, and a second sensing path including the second bipolar transistor, the first sensing path and the second sensing path each further comprises a CMOS transistor having a drain terminal coupled to an emitter terminal of the respective bipolar transistor in the respective sensing path.

6. The circuit of claim 5, where the circuit is configured to provide a voltage variation, $\Delta V_{be}$, given by $$\Delta V_{be} \approx N \frac{nk\ln\left(\frac{s}{b}\sigma\right)}{q} T,$$

where s and b are controllable geometry parameters, $\sigma$ is a ratio of cross-sectional areas in the bipolar transistors or diodes, k is a Boltzmann constant, q is a charge constant, T is temperature, and N is an integer having a value based at least in part on the number of sensing paths in the differential sensing path circuit.

* * * * *